Jan. 16, 1968 R. D. IRVIN 3,363,853

STRIP RECORD MEDIUM TRANSPORTING APPARATUS

Filed July 11, 1966 4 Sheets-Sheet 1

INVENTOR
RONALD D. IRVIN

By [signature]
ATTORNEY

Jan. 16, 1968 R. D. IRVIN 3,363,853

STRIP RECORD MEDIUM TRANSPORTING APPARATUS

Filed July 11, 1966 4 Sheets-Sheet 2

1

2

3,363,853
STRIP RECORD MEDIUM TRANSPORTING APPARATUS

Ronald Duane Irvin, Los Gatos, Calif., assignor to International Business Machines Corporation, Armonk, N.Y., a corporation of New York Filed July 11, 1966, Ser. No. 564,190
14 Claims. (Cl. 242—55.12)

The invention relates to electromechanical apparatus for transporting magnetic tape and motion picture film and the like for directly selecting portions thereof for reproducing the information recorded thereon for use in data processing and process controlling systems such as machine teaching systems, for example, and the like.

Magnetic and paper tape transporting mechanisms and motion picture film transporting mechanisms are of course well known in the art. The transportation of tapes and films at high speed in a searching operation followed by relatively lower speed transportation for recording or reproducing intelligence is also known. The artisans have also addressed themselves to the object of providing such apparatus with simplified controls for the operator, including self-threading features. For the most part, such prior art apparatus has taken the form of complicated electromechanical structures having a large number of individual parts.

According to the invention a low cost, more reliable strip record medium transport of simple and economical construction, for fast searching and normal recording and reproducing comprises a transducer, at least three capstans and a pair of pressure rollers arranged to pass the strip record medium by the transducer in response to the rotation of one of the capstans bearing on the strip record medium as influenced by a pressure roller. In the preferred embodiment of the invention, the transducer is located intermediate the search capstans, and a pair of pressure rollers are arranged on the beam of dimensions at which the pressure rollers are adjacent to, but not in contact with, the search capstans. The search capstans are energized by suitable means, preferably an electric motor, arranged to drive the search capstans in opposite rotational directions. Means are provided for shifting the beam from a neutral position in one direction for urging a pressure roller against the strip record medium and the corresponding search capstan. Similarly, means are provided for moving the beam in another, preferably the opposite, direction for engaging the other of the pressure rollers with the strip record medium against the other search capstan to drive the strip record medium in another direction. The normal speed transducing drive capstan is located along the path of the strip record medium between the transducer and one of the search capstans. The beam positioning means is arranged for moving the beam in a further direction differing from the aforesaid directions for engaging one of the pressure rollers with the strip record medium and the transducing drive capstan. Preferably the beam positioning means comprise a pair of solenoids individually connected to the ends of a dual bell crank which in turn is pivoted on an elevator arm. The bell crank is connected to the beam and with the elevator arm in the initial position the beam is moved in two directions by differential operation of the crank by the solenoids. The solenoids are energized simultaneously to lift both the elevator arm and the toggle bar in the third direction bringing the pressure roller on one end of the beam into engagement with the transducing drive capstan.

Further, according to the invention, a pair of tape snubbing and guiding members are arranged on either side of the transducer at one side of the strip record medium and a pair of pressure pads on a mechanical linkage are arranged selectively to snub the strip record medium against one of the guiding and snubbing members. The selective action is obtained by means of an extension on one of the movable beam supporting members which is arranged to pick up one of the pads due to the position of the member. This will leave the other pad exerting pressure against the strip record medium and the snubbing member on one side of the transducer to cause the strip record medium to bear against the transducer in response to the tension exerted on the strip record medium by the capstan and pressure roller at the other side of the transducer. A further solenoid and link member are provided to lift both pads off the strip record medium when any pressure is undesirable.

Further, according to the invention, a single motor rotating in a single direction is used to drive all three capstans. The motor is preferably equipped with two pulleys and each capstan with a single pulley. The dimensions of the pulleys are such that the proper driving speeds are imparted to the capstans. The belt driving the search capstans is arranged over pulley surfaces of the shafts of the search capstans with one side of the belt contacting one of the capstans for rotation in one direction and the other side of the belt contacting the other capstan for rotating it in the opposite direction.

The apparatus according to the invention is designed for handling a reel-record assembly of the type wherein the reel comprises a hub member and a pair of flanges extending normally of the hub for accommodating a strip record medium wound about the hub between the flanges. Near the outer periphery of the inner surfaces of the flanges are juxtaposed internal annular grooves for accommodating a strip leader which is attached to the record medium for sealing the latter within the reel by flexing the strip leader into and out of the annular grooves. A short narrowing tip of the leader extends tangentially of the outer convolution of the leader in position for sealing the reel.

The reel is supported according to the invention in a triad of rollers placed about the periphery of the reel. One of the rollers is a drive roller having rubber friction rings bearing on the rims of the flanges to rotate the reel. The drive roller is coupled to a reversible electric motor or a drive puck is arranged to obtain power from the capstan drive motor for driving the reel if desired. The pad solenoid may be used to interpose the puck and an idler gear may be used to change the direction of rotation. Another of the rollers is arranged on an arm to be revolvable through a relatively short arc about an axis beyond the rotational axis of this roller so that this roller may be moved away from the reel for admitting and withdrawing a reel to and from the transport. Preferably, this arm is resiliently biased to urge the roller against the reel for insuring adequate frictional contact with a drive roller for driving the reel.

Further, according to the invention, a bin-like shoe member accommodating the reel is pivoted in the machine and arranged to use the reel flanges as camming surfaces to displace the movable roller for admitting the reel into the triad. The shoe member has openings admitting the rollers to the rims of the reel for supporting and driving it. One of the rollers is equipped with a leader flexing roller intermediate the surfaces contacting the reel. This leader flexing roller extends into the reel between the flanges for flexing the leader or inserting it into the grooves on rewinding the reel. A number of fixed guide wall members are arranged between the reel and the capstans to form a channel or conduit for threading the leader through the transport. One of these wall members extends into the reel to a point adjacent the outer surface of the annuloidal space defined by the annular grooves. This wall member is so shaped that it engages the tangentially extending tip of the leader as the reel is rotated for loading the machine. Positive engagement of the tip of the leader and the stripping spur of the member is insured by using a rubber flexing roller contacting the leader in the reel when it is in position in the machine. The one member has a camming surface arranged for gently guiding the leader through the channel conduit formed by the wall members for threading the machine.

According to the invention, one or more rollers are arranged in the channel between the reel and a succeeding drive member so that when the strip record medium is being pulled by the drive member, the threading motor having been disconnected at this time, the leader no longer bears against the camming surface of the channel member but is drawn over only a roller. By this means, the strip record medium itself is subjected to a minimum of wear.

The apparatus according to the invention is equipped with one or two bins into which the strip record medium is loaded for temporary storage during operation of the transport. This affords much faster operation of the system in which it is to be used than arrangements using takeup and supply reels of large inertia.

In order that the advantages of the invention may be readily attained in practice, a description of a preferred embodiment of the invention is given hereinafter, by way of example only, with reference to the accompanying drawing forming a part of the specification and in which:

FIG. 1—Sections (*a*), (*b*), (*c*), and (*d*), being taken together—is a more or less schematic diagram illustrating the salient portions of a strip transporting structure and the mode of operation according to the invention;

Figure 1A:
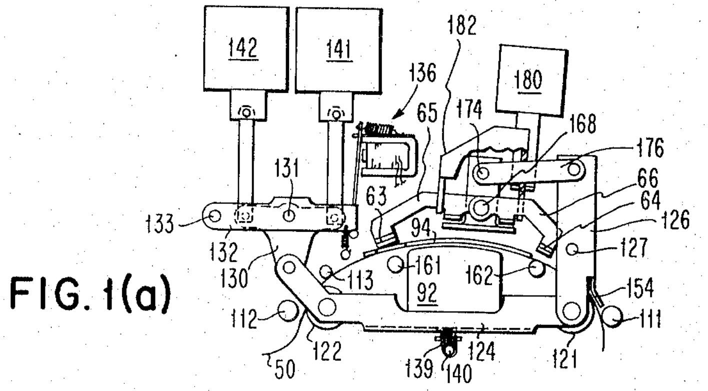
Figure 1B:
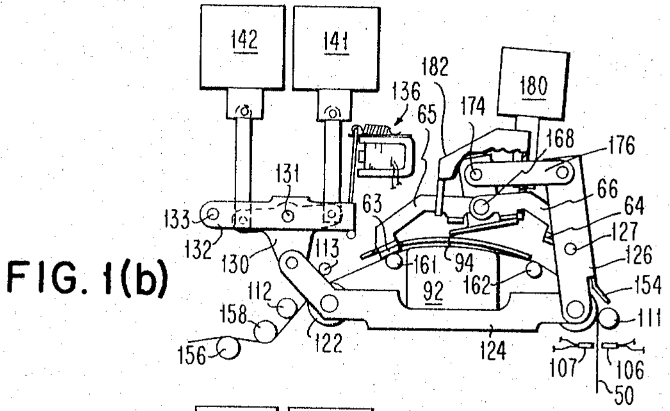
Figure 1C:
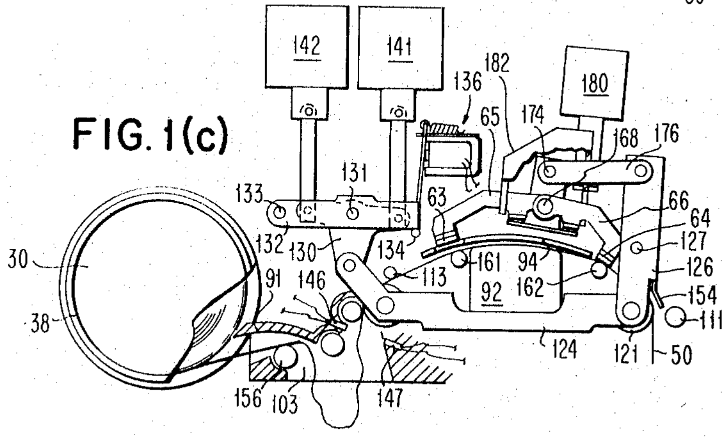
Figure 1D:
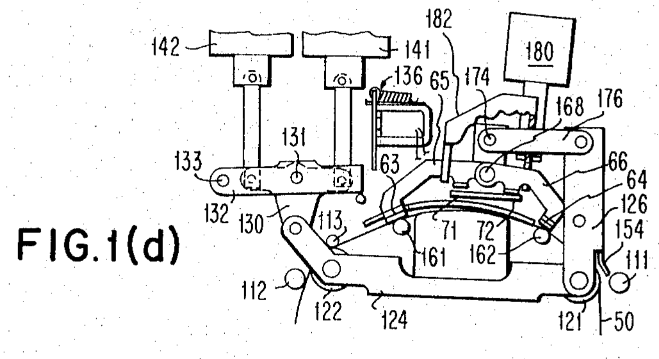
Figure 2:
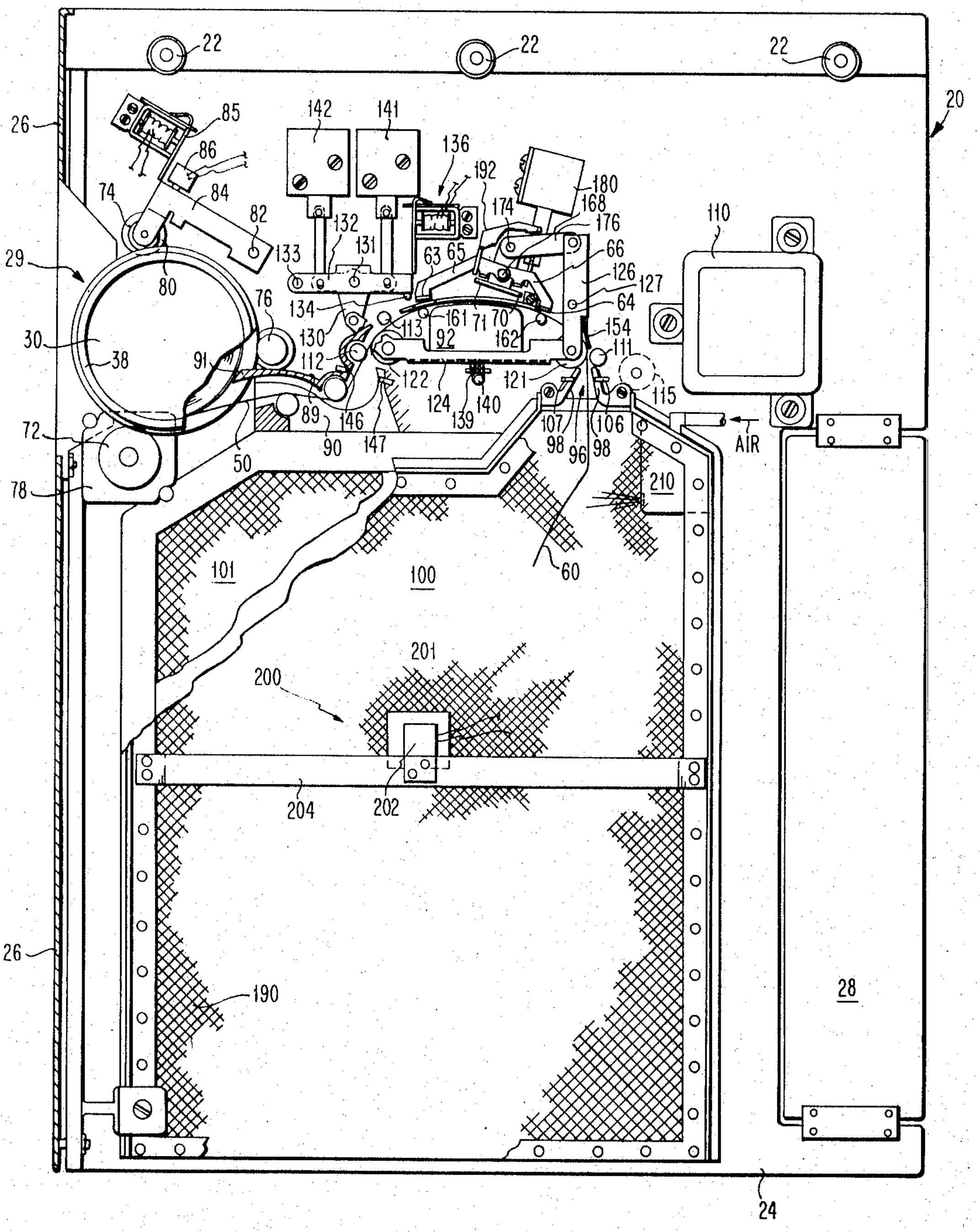
FIG. 2 is a near side view of a magnetic tape transport according to the invention.
Figure 3:
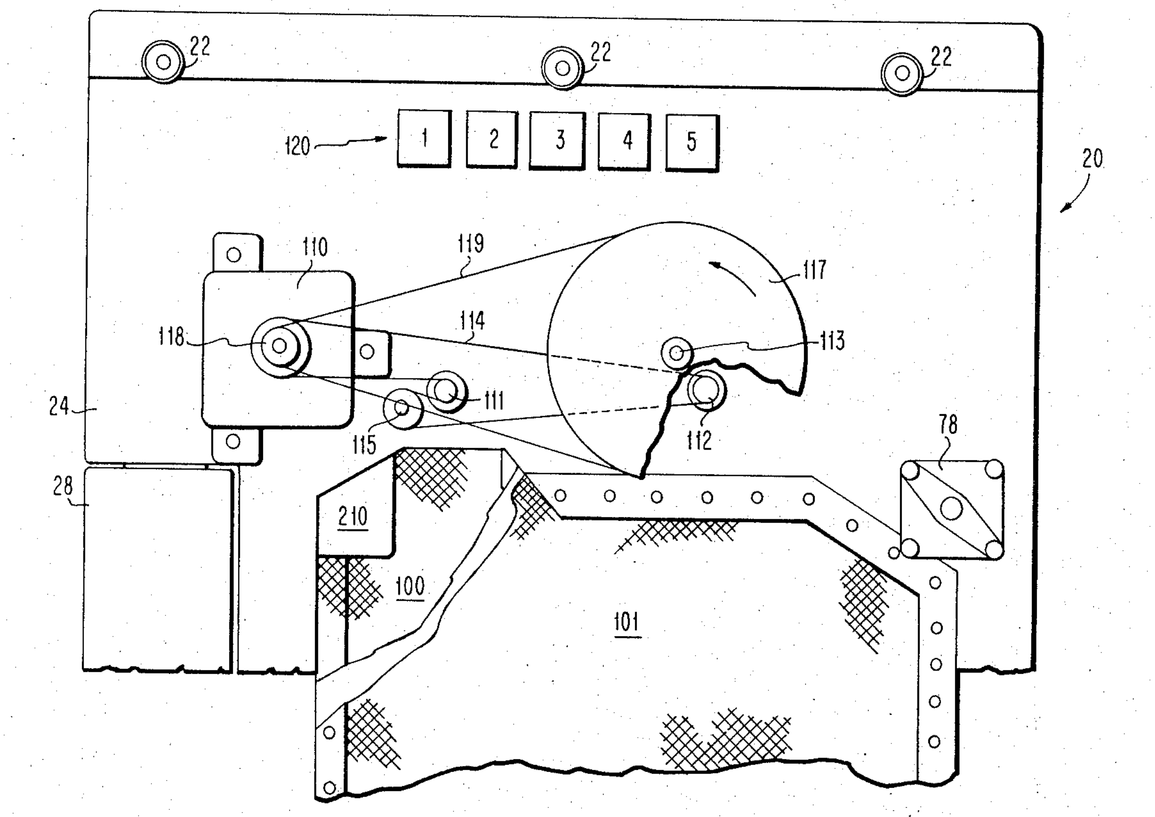
FIG. 3 is an off-side view of the magnetic tape transport according to the invention as illustrated in FIG. 2.

FIG. 1 is a schematic diagram emphasizing the novel features of a magnetic tape transport according to the invention in substantially the same configuration as for the tape transport shown in greater detail in FIGS. 2 and 3. A strip record medium transport according to the invention may be packaged in many forms depending on the requirements faced by the artisan; the form shown in FIG. 2 is that of a drawer suspended at or near the top for affording maximum stability. In practice several of these drawers will be arranged in a cabinet comprising a skeletal rack to which outer panels are attached and further apparatus is arranged internally including glideways for the drawer shown. This preferred embodiment of the invention comprises a cast frame 20 of T-shaped cross-section having glides 22 permitting the drawer to be slid in and out of the cabinet on the glideways (not shown). The major part of the components making up the invention are mounted on a web 24 which is an integral part of the cast frame 20 forming the stem of the T-shaped section. A front panel 26 is arranged to close the cabinet and is designed to blend with the aesthetic design of the cabinet. A circuit board 28 is suspended in the web 24 at the rear of the frame. At the upper part of the drawer the front panel 26 is apertured to form a throat 29 in the frame 20, through which a reel 30 carrying a strip record medium is inserted and withdrawn.

Figures 4, 5:
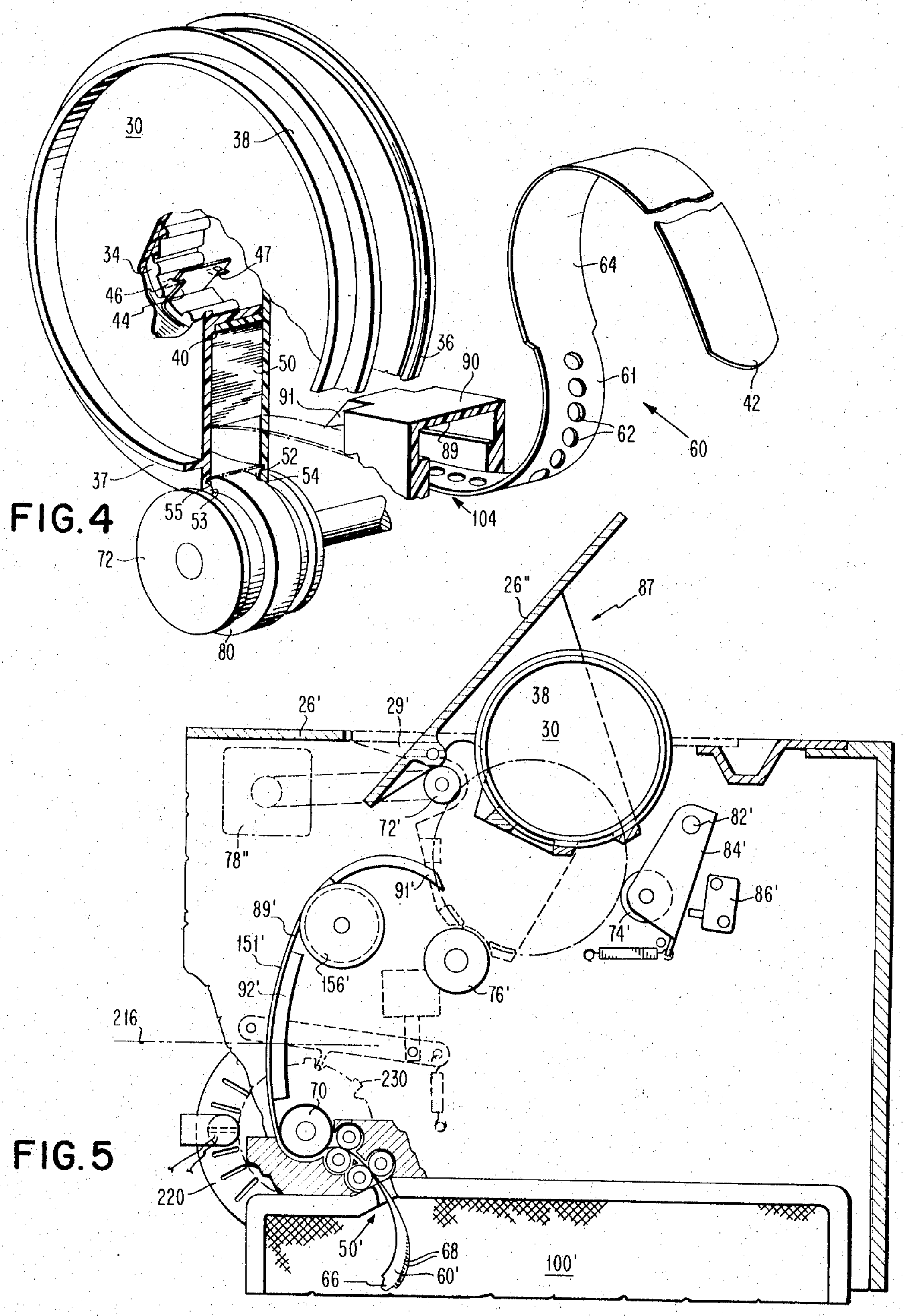
FIG. 4 is a detailed illustration of a reel, drive roller and other associated parts according to the invention.
FIG. 5 is an illustration of an alternate embodiment of the invention comprising a photographic film transport.

The reel 30 is shown in greater detail in FIG. 4, is formed of mating sections of plastic or other suitable material, providing a hub portion 34 and flange portions 36 and 37. One of the flange portions has an external annular ring 38 arranged thereon orienting the reel so that it may be inserted only in one way in the complementary shaped throat 29 and at the same time offer a surface readily gripped by the finger. A trailer, of width substantially equal to the lateral spacing between the flange portions 36 and 37, has a narrow terminal portion 42 which is inserted into a gripping slot 44 which is at an angle of approximately 30° with respect to a radial line at the hub portion 34. Within the hub portion are two gripping posts 46 and 47 which accept the end of the trailer terminal portion 42 in a secure grip. The trailer 40 is spliced to the strip record medium, shown here as a length of magnetic tape 50 (but which alternately can be photographic film) wound on the hub in the usual manner. At the outer periphery of the flange portions 36 and 37 are a pair of annular grooves 52 and 53. The internal surfaces 54 and 55 of the flanges 36 and 37 respectively are shaped as shown to provide an annular throat about the periphery of the reel. A leader 60 having a long opaque section 61 of width equal to that of the tape is spliced to the tape 50. Holes 62 in the leader are arranged to effect a sensing slot without weakening the leader. Similar holes are punched in the tape 50 or in the trailer 40 for the same purpose. Alternately transparent sections of tape and leader are provided. The leader 60 expands to a wider portion 64 of width substantially equal to the width of the annular grooves 52 and 53 across the flanges of the reel. This wider portion of the leader 64 only is frequently referred to as though it constituted the entirety of the leader itself. The leader 60 is sufficiently stiffer than the tape 50 so that it may be pushed by rotation of the reel 30, for automatically threading the machine. The leader also serves to seal the reel and the tape within it upon being flexed and snapped into the annular grooves 52 and 53. The length of the leader 60 is such that the reel is completely sealed. With motion picture film, or other apertured strip record media, the length of the leader is such that all sprocket holes in the leader are completely covered by at least one convolution of the leader 60.

The reel is supported for rotation by a triad of three rollers, 72, 74, and 76 on the frame 20. As shown in FIG. 2 the roller 72 is a drive roller rotated by a bi-directional reel-drive motor 78. Preferably the drive roller 72 carries a leader flexing roller 80 as shown better in FIG. 4 for flexing the leader 50 in rewinding the tape and leader to seal the reel. The flexing roller 80, which may be integral with the driving roller 72, is preferably arranged to eliminate leader slippage relative to the reel in the unwinding operation. Preferably the drive roller 72 and the flexing roller 80 are constructed of rubber, or like material, having a high coefficient of friction on the leader material and at least at the rim of the reel 30. The upper roller 74 shown in FIG. 2 is revolvable about a pivot 82 of an arm 84 which may be raised and lowered for inserting a reel 30 into and withdrawing it from the machine. The arm 84 is urged into engagement with the reel by gravity or by resilient means such as a spring. A relay type electromagnetic lock 85 is arranged to maintain the roller 74 in contact with the reel 30 so that the latter may not be unintentionally inserted into or withdrawn from the machine until an unload switch (not shown) or the like is actuated. The lock 86 may be so wired, or preferably another switch 86 of the proper type is employed to interlock the circuitry so that operation may be obtained only if a reel 30 is in the machine. In an alternate embodiment of the invention a film reel 30′ is inserted into a shoe 87 of configuration similar to a bin, having a cavity reduced on one side to orient the reel properly as shown in FIG. 5. The flanges of the reel 30′ in the bin 87 force a revolvable roller 74′ outwardly of the triad to permit the reel 30 to be inserted and withdrawn. The shoe 87 is apertured so that the drive roller 72′ the roller 74′ and a fixed (except for initial adjustment) roller 76′ bear on the rim of the reel 30 for supporting and driving it. One of the rollers has a leader flexing roller (not shown) as described above. The bin 87 has a closing panel 26″ arranged to lie flush with a top panel 26′ for closing the throat 29′ of the machine. The shoe 87 may, of course, be adapted to the magnetic tape transport by one skilled in the art as will readily be seen upon referring to FIG. 2.

A strip guiding wall portion 89—preferably forming a part of a casting 90—is terminated in a tip or stripping spur 91. The spur 91 extends into the throat between the flanges of the reel 30 to a point adjacent the wound leader 50 so that the tangentially extending terminal portion 42 will strike the underside of the wall portion 88 and follow along its surface under the urging of the reel 30 as it is driven. The roller 76 is an idling roller with relatively fixed axis of rotation, however, the axis is preferably arranged for adjustment at the factory in order to place the stripping spur 91 at exactly the desired relationship to the leader 60 on the reel 30.

An electromagnetic transducer assembly 92 is arranged on the web 24 in conventional manner. In practice the transducer assembly 92 may comprise three groups of erasing, recording and reproducing transducers aligned in pre-determined relationship for multi-track recording on the tape 50. A leader camming member 94 is arranged above the transducer bank 92 so that the leader 60 is guided by the undersurface of the member 94 over the heads in the transducer bank 92 in the threading operation. Eventually the leader 60 will enter a throat 96 formed by a pair of throat pieces 98 to a supply bin 100. This bin 100 and a similar take-up bin 101 having a throat 103, are arranged on the web 24 as will be described further hereinafter.

As the leader 60 passes through the throat 96 of the bin 100 the presence and absence of the slot effected by the holes 62 in the leader is sensed by light from a lamp 106 falling on a cooperating photodetector device 107 across the throat 96. Simple control circuitry (not shown) is arranged to transfer the leader and tape driving effort from the leader threading motor 78 to a constant-speed capstan drive motor 110. Three capstans 111, 112 and 113 are arranged with respect to the throats 96 and 103 and the transducer bank 92 for transporting the tape 50 as required. The tape 50 is transported by the reverse search capstan 111 by means of a resilient pressure roller 121. This reverse pressure roller 121 and a forward pressure roller 122 are arranged at the ends of a movable beam 124.

As shown in FIG. 3, the search capstans 111 and 112 are driven in opposite directions by the motor 110 by means of a belt 114. The forward search capstan 112 rotates in the same direction as the drive motor 110 while the reverse search capstan 111 is driven from the other side of the belt 114 to rotate in the opposite direction. A reversing pulley 115 is utilized both for adjusting the tension of the belt 114 and for insuring sufficient frictional contact of the belt 114 with the reverse search capstan 111.

A transducer capstan pulley 117 of relatively large diameter is coupled to the transducer capstan 113 for driving the latter at a relatively slow speed by means of a relatively smaller motor pulley 118 and a belt 119. In this manner a single motor 110 rotating in the same direction continuously is arranged for driving three capstans at uniform rates, differing by a factor of as great as 35 for example.

Returning to FIG. 2, the beam 124 is supported at one end by an arm 126 rotatable about a pivot 127. The other end of the beam 124 is coupled to a T-shaped, dual bell crank 130 rotatable about a pivot 131 on an arm 132 in turn rotatable about a pivot 133 arranged on the web 24. The elevator arm 132 is prevented from dropping by a pin 134. A pair of solenoids 141 and 142 are linked to the ends of the bell crank 130 by suitable rods.

Another lamp 146 and photosensing device 147 are arranged in the throat 103 to form a forward sensing station. Preferably these components are mounted in the casting 90 hereinbefore mentioned. The casting 90 has a leader and tape channel 104 arranged therein communicating with the take-up bin throat 103. The walls of the channel 104 are arranged to guide the leader 60 and the tape 50 between the forward search capstan 112 and the pressure roller 122 after which the previously mentioned transducer bank wall member 94 continues the guiding. A guide member 154 on the arm 126 serves to direct the leader 60 and the tape 50 between the reverse search capstan 111 and the cooperating pressure roller 121 and thence through the throat 96 into the bin 100. A pair of guide rollers 156 and 158 are arranged into the casting 90 so that after the tape 50 is transported by the reverse search capstan 111 the tape 50 contacts the rollers 156 and 158 without touching any of the wall members of the casting 90 in order to reduce wear on the tape. Preferably the rollers are made of nylon or similar material exerting little wear on the tape 50.

A pair of tape guiding and snubbing posts 161 and 162 are arranged at either side of the transducer bank 92. A pair of pressure pads 163 and 164 are arranged above the snubbing posts 161 and 162 so that the tape 50 passes therebetween. The pads are supported by pad arms 165 and 166 respectively which rotate about a pivot 168 fixed into the web 24 of the frame 20. A suitable aperture is arranged in the wall member 94 to permit the passage of the pad 163 and its support arm 165. A pair of pad arm pick-up fingers 171 and 172 are arranged on a rocker arm 174 pivoting about the pivot 168 in response to force exerted by the arm 126 through a link 176. A solenoid 180 is arranged to pick up both pads 163 and 164 by means of a bifurcated pick-up hook 182. A solenoid actuated lock 136 is arranged to restrain the movement of the elevator arm 132.

The operation of the tape transport is more readily seen with reference to FIG. 1. With the electric power off, the pressure pads 163 and 164 rest on their respective snubbing posts 161 and 162, effectively blocking passage of the leader 60 and the tape 50. When the power is turned on the solenoid 180 is connected to provide the motive force for lifting both pads 163 and 164 as shown in FIG. 1(*a*). No energy is supplied to the solenoid of the lock 136 or to the beam positioning solenoid 141 and 142. The pressure roller beam 124 is centered in its intermediate position with respect to the search capstans 111 and 112 by means of a pair of torsion springs 139 mounted on a post 140. The beam 124 is also beneath the transducing drive capstan 113 leaving the entire leader and tape channel 90 clear for transport of the leader 60 under the urging of the reel 30 as it is rotated by the reel drive motor 78. As the leader 60 passes the reverse sensing station in the throat 96 the solenoid 141 is actuated. This in turn rotates the bell crank 130 urging the beam 124 in a reverse direction so that the tape 50 is transported by the reverse search capstan 111 under the pressure of the pressure roller 121 as shown in FIG. 1(*b*). This mode of operation continues until the leader and all of the tape 50 has been emptied into the supply bin 100. The trailer 40 has now emerged from the reel 30 so that the transparent tape section or holes in the tape 50 or the trailer are at the forward sensing station in the throat 103 and the reverse sensing station in the throat 96 whereupon the reverse solenoid 141 is deenergized. The logic circuitry controlling the tape transport according to the invention is then arranged to energize the other beam position solenoid 142 to urge the beam in the forward direction whereupon the tape is advanced to the first address or intelligence recording thereon. The relatively limp tape 50 is forced to loop into the throat 103 of the take-up bin 101 in which the tape will be deposited as it is transported in the forward direction. Thus the tape as used in the recording and reproduction of intelligence for which the tape transport is designed shuttles back and forth between the supply bin 100 and the take-up bin 101, eliminating a great many problems brought about by the inertia of reels and the complexity of reel drive servo systems and the like used quite frequently for this purpose. The forward search operation is shown in FIG. 1(*c*). The solenoid operated lock 136 is energized to free the elevator arm 132 and both solenoids 141 and 142 are simultaneously energized to lift the beam 124 substantially perpendicular to its movement during search to bring the forward pressure roller 122 against the tape 50 and the transducing capstan 113 as shown in FIG. 1(*d*).

Figure 6:
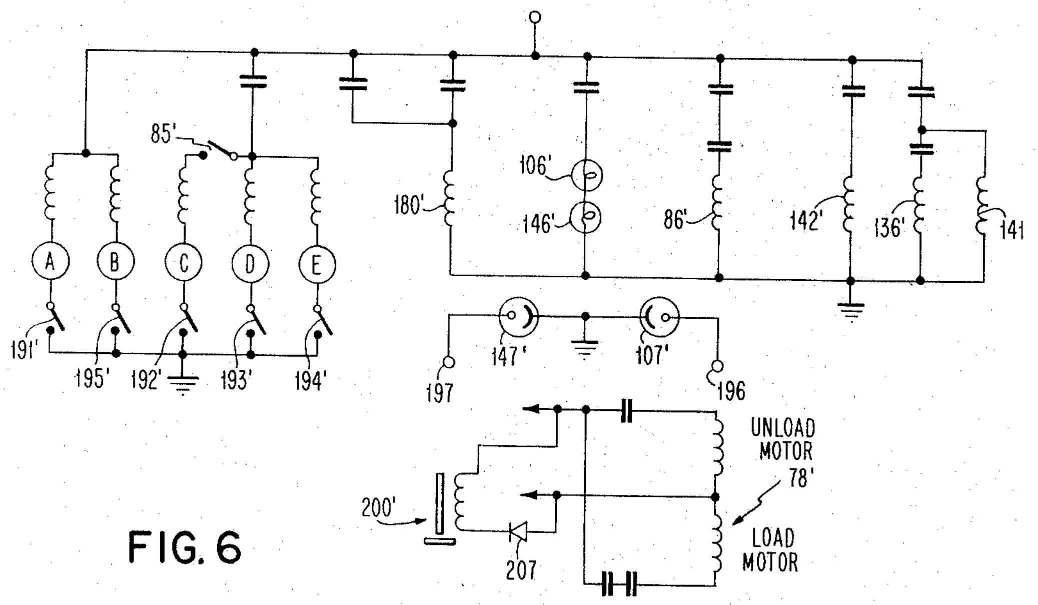
FIG. 6 is a wiring diagram of the tape transport shown in FIGS. 2 and 3.

FIG. 6 is a wiring diagram showing the relays and solenoids as arranged on the web 24 and as wired to operate the transport. The switches 191–195 are actually a part of the logic circuitry, although for test purposes a bank of switches can be wired exactly as shown. Leads 196 and 197 to the photosensing devices 147′ and 107′ also are connected to the logic circuitry for controlling the previously mentioned circuitry switches in accordance with the presence of the leader, tape and trailer in the channel 104.

The bins 100 and 101 are arranged side by side, or one in front of the other as seen in FIG. 2. The bins must be wider than the magnetic tape and the leader but less than twice the width of the tape to prevent fouling of the tape in storing and issuing. The bins are canted with respect to the tape channel 104 so that the throats 96 and 103 are aligned with the tape channel 104 and render the necessary transition permitting the tape to fall smoothly in the bins 100 and 101. These storage bins are designed to store the tape 50 with only the requirement of lifting a very small and short section of tape at any one time in the operating cycle. Since the inertia of the tape is low, the tape may be stopped at the desired location by merely releasing the tape from the drive capstan. While a single bin might be used, the use of two bins eliminates potential problems with interleaving of the tape especially during alternating high speed searches. Prior art bins of the type similar to those shown are subject to the building up of static charges preventing the tape from dropping to the bottom of the bin as desired. Air pockets, too, tend to build up which prevent the tape from fully occupying the storage volume. Because the tape is very light, very little friction can be tolerated between the bin walls and the tape. As shown the bins 100 and 101 have one side of each constructed with stretched, preferably calendered, wire cloth 190. Perforated metal may be used if desired. The screen side provides lower coefficient of friction, reasonable flatness of the walls, electro-conductivity to avoid static electricity problems and transparency permitting inspection during operation, without acoustic disturbance. Lower construction costs also are afforded. A solid common wall is shown, however, alternatively the bins may be constructed with a strong outer frame and stretched screens for all three walls.

Consistent settling of the maximum amount of tape in bins of minimum volume is aided by vibrating the outer panels of the bins. A suitable vibrator 200 is shown comprising a magnetic plate 201 fixed to the screen 190. This plate is preferably of iron but other magnetic materials may be used. A vibrator magnet assembly 202 is arranged near the metal plate 201 on a mounting bar 204. The magnet assembly 102 comprises a magnetic core and a magnet winding. Rubber bumpers are provided to absorb the shock as the iron plate is alternately attracted and repelled from the magnetic core through the application of alternating current electric power. Preferably a diode 207 (FIG. 6) is inserted in the power leads whereby the plate 201 is vibrated at twice the frequency of the power line alternations.

Further aids for utilizing maximum bin storage volume comprises the use of a stream of air projected through the screen sides as by a nozzle assembly 210 (FIG. 2). Considerable latitude exists in the choice of air pressure and direction and rate of flow of the air.

The embodiment of the invention shown in FIG. 5 is a self threading photographic film image projector. A strip of film 50′ has a leader 60′ with a tip 66 cut to dimensions and located with respect to the sprocket holes 68 so that the sprocket 70 is rotated and engaged by the film 50′ as it is urged forward by rotation of the reel 30′ to a bin 100′. A stripping spur 91′ and a guide roller 156′ correspond to the spur 91 and guide element 156 described earlier. The motor 78″ is of the reversible type providing the motive power for threading the film 50′ through a channel 151′ effected by a guide wall 89′ and a curved film gate block 92′ through which light from a projector lamp and condenser assembly (not shown) passes along an axis 216 to a conventional optical lens and shutter system (not shown) and to a distant screen (not shown). A slotted timing pulse wave generator disk 220 and a detent disk 230 are arranged on the same shaft as the sprocket 70 for controlling the positioning of the individual frames of the film 50′.

While the invention has been shown and described particularly with reference to a preferred embodiment thereof, and an alternative has been suggested, it should be understood that those skilled in the art may effect still further changes without departing from the spirit and scope of the invention as defined hereinafter.

The invention claimed is:

1. A strip record medium transport, including
a forward search capstan,
a reverse search capstan,
a transducing drive capstan,
means for rotating said capstans,
a beam,
a pressure roller mounted at each end of said beam,
means for position said beam in one direction engaging one pressure roller with said strip record medium against one search capstan,
means for position said beam in another direction for engaging the other of said pressure rollers with said strip record medium against the other of said search capstans, and
means for positioning said beam in a further direction differing from the aforesaid directions for engaging one of said pressure rollers with said strip record medium against said transducing drive capstan.

2. A strip record medium transport adapted for handling
a reel of the type having
a hub,
a pair of flanges extending normally of said hub for accommodating a strip record medium therebetween wound about said hub,
said flanges having opposing internal annular grooves near the outer periphery for accommodating a strip leader for sealing the record medium within said reel,
said leader having one portion substantially the width of the strip record medium to which it is attached, and an end portion substantially the width of the reel between said grooves, and terminating in a relatively short narrowing tip extending tangentially of the outer convolutions of said leader in sealing said reel, reel supporting and driving means comprising, a triad of rollers arranged for engaging a reel about the periphery thereof,
one of said rollers being a drive roller with a substantially fixed rotational axis,
another of said rollers being revolvable about an axis beyond the rotations axis for admitting and withdrawing a reel to and from the transport,
one of said rollers having a leader flexing roller of diameter at which the periphery thereof extends into the reel between the flanges for flexing said leader for insertion into said grooves on rewinding the reel, and
fixed leader and strip record medium camming members forming a conduit for threading said strip record medium in the transport,
one of said members extending into the reel to a point adjacent the outer surface of the annuloidal space defined by said grooves for engaging the tip of said leader as the reel is rotated and stripping the leader from the reel,
said one member having a camming surface for guiding said leader through said transport,
transducing means, interposed in said conduit, and
a bin having a throat for receiving said strip record medium after passing through said transport.

3. A strip record medium transport as defined in claim 1 and wherein,
said positioning means comprises two solenoids arranged for operation in binary combinations, and
means arranged with said pressure rollers and said capstans for guiding said strip record medium freely therebetween in one of said combinations.

4. A strip record medium transport as defined in claim 1 and incorporating,
a transducer,
two pressure pads, and
cooperating snubbing posts arranged at either side of said transducer for pressing said strip record against said transducer without inducing wear.

5. A strip record medium transport as defined in claim 4 and incorporating
a linkage coupled to said beam for differentially engaging said pressure pads, and
means coupled to said linkage for disengaging both of said pads.

6. A strip record medium transport as defined in claim 1 and further including,
a motor rotating in a single direction,
a belt arranged on the shaft of said motor and over the shafts of said search capstans with one side of said belt contacting one of said search capstans for rotating it in one direction and the other side of said belt contacting the other search capstan for rotating in the opposite direction.

7. A strip record medium transport as defined in claim 1, and adapted for handling
a reel of the type having a hub,
a pair of flanges extending normally of said hub for accommodating a strip record medium therebetween wound about said hub,
said flanges having opposing internal annular grooves near the outer periphery for accommodating a strip leader for sealing the record medium within said reel,
said leader having a portion substantially the width of the strip record medium to which it is attached, and
an end portion substantially the width of the reel between said grooves, and terminating in a relatively short narrowing tip extending tangentially of the outer convolutions of said leader in sealing said reel,
reel supporting and driving means comprising a triad of rollers arranged for engaging a reel about the periphery thereof,
one of said rollers being a drive roller with a substantially fixed rotational axis,
another of said rollers being revolvable about an axis beyond the rotational axis for admitting and withdrawing a reel to and from the transport,
one of said rollers having a flexing roller of diameter at which the periphery thereof extends into the reel between said flanges for flexing said leader for insertion into said grooves on rewinding the reel, and
fixed leader and strip record medium guide wall members forming a conduit for threading said strip record medium in the transport,
one of said members extending into the reel to a point adjacent the outer surface of the annuloidal space defined by said grooves for engaging the tip of said leader as the reel is rotated and stripping the leader from the reel,
said one member having a camming surface for guiding said leader through said channel.

8. A strip record medium transport as defined in claim 7, and wherein
said flexing roller has an outer diameter at which the periphery extends into the annuloidal space defined by said grooves for contacting said leader in said grooves.

9. A strip record medium transport as defined in claim 7 and incorporating a pair of guiding rollers arranged in said channel for guiding said strip record medium away from the camming surface of said conduit as the medium is transported by means of one of said capstans and the associated pressure roller.

10. A strip record medium transport as defined in claim 8, and incorporating
two bins arranged with the throats thereof on either side of said search capstans,
one of said bin throats being arranged beyond said capstan for receiving said leader and said strip record medium for temporary storage,
the other of said bin throats being arranged before said capstans for receiving a portion of said strip record medium for temporary storage, whereby normal operation of said transport involves transfer of said strip record medium only between said bins,
beam positioning means comprising two solenoids arranged for four modes of operation at least one transducer arranged between said search capstans,
two pressure pads and cooperating snubbing members arranged at either side of said transducer,
linkages for differentially and simultaneously raising and lowering said pressure pads selectively,
a motor rotating in a single direction,
a belt arranged on the shaft of said motor and over the shafts of said search capstans with one side of said belt contacting one of said search capstans for rotating it in one direction and the other side of said belt contacting the other such capstan for rotating it in the opposite direction, and
a speed reducing arrangement, comprising:
a large pulley driven by said motor, and
a small pulley driving said transducing drive capstan.

11. A strip record medium transport as defined in claim 2 and incorporating
strip moving means arranged beyond said triad and before said bin for moving said strip record medium after said leader is threaded, and
at least one guiding member between said reel and said transducing means arranged for guiding said strip record medium away from said camming surface for preventing wear on said strip record medium.

12. A strip record medium transport as defined in claim 7 and wherein
bins having throats are provided for receiving said strip record medium,
one of said bins having the throat thereof beneath said one camming member, and
said member has a channel of differing widths, whereby said leader is threaded past the throat of said one bin, and the strip record medium is free to drop down into the throat of said one bin.

13. A strip record medium transport as defined in claim 1 and incorporating a pair of torsion coil springs arranged to urge said beam in a position intermediate said search capstans.

14. A strip record medium transport as defined in claim 1 and wherein said beam has at least one aperture therein located centrally of said pressure rollers, and incorporating means normally positioning said beam in a neutral position comprising, a stud affixed to the frame of said transport, a pair of coiled torsion springs mounted on said stud with the tangs of one end fixed in position and the tangs of the other ends protruding into said aperture of said beam in opposing directions of force.

References Cited

UNITED STATES PATENTS

| | | | |
|---|---|---|---|
| 2,919,076 | 12/1959 | Buslik et al. | 242—55.12 |
| 3,006,650 | 10/1961 | Ellmore | 274—4 |
| 3,126,161 | 3/1964 | Bemiss et al. | 242—55.12 |
| 3,254,858 | 6/1966 | Camras et al. | 242—55.13 |

LEONARD D. CHRISTIAN, *Primary Examiner.*